UNITED STATES PATENT OFFICE.

HENRI RAYMOND VIDAL, OF PARIS, FRANCE.

SULFUR DYE.

SPECIFICATION forming part of Letters Patent No. 594,105, dated November 23, 1897.

Application filed February 26, 1897. Serial No. 625,210. (Specimens.) Patented in France August 18, 1896, No. 258,978.

*To all whom it may concern:*

Be it known that I, HENRI RAYMOND VIDAL, of Paris, France, have invented certain new and useful Improvements in the Manufacture of Coloring-Matters, (for which French Patent No. 258,978, dated August 18, 1896, has been obtained,) which are fully described in the following specification.

By the action of sulfur alone or of sulfur and ammonia, either directly or in connection with alkaline sulfids, I have obtained, with certain meta derivatives of benzene, coloring-matters which possess the quality of directly coloring vegetable fibers black or blackish brown. These bodies or substances may be divided as follows: first, dihydroxylated derivatives; second, amidohydroxylated derivatives; third, diamidated derivatives; fourth, sulfureted derivatives; fifth, triamidated derivatives.

First. *Dihydroxylated derivatives.* — By causing sulfur to react in a closed vessel upon resorcin in the presence of ammonia a black substance is formed, which is soluble in alkaline sulfids and which in this condition will directly color vegetable fibers. For example, I heat in a closed vessel to 260° centigrade thirty kilograms of resorcin saturated with ammonia-gas and 6.40 kilograms of sulfur. The time of reaction is about eight hours. When discharged from the apparatus, the product is a blackish brittle mass. It is soluble (appearing greenish black) in alkaline sulfids and alkalies; also in concentrated sulfuric acid. It dyes unmordanted cotton brown.

Second. *Amidohydroxylated derivatives.* — The metaämidophenol likewise reacts upon sulfur alone. It yields a coloring-matter which may be directly applied to the coloring of vegetable fibers by solution in alkaline sulfids. For example, I heat in a closed iron vessel placed in an oil-bath twenty-two kilograms of metaämidophenol and 6.40 kilograms of sulfur at a temperature of 260° for about eight hours. The metaämidophenol may be replaced by the mass reduced from metanitrophenol in connection with alkaline sulfids. In this case the sulfur is added after the previous reduction of metanitrophenol by sulfur.

Third. *Diamidated derivatives.* — Metaphenylenediamin heated with sulfur likewise reacts so as to yield a coloring-matter which is soluble in alkaline sulfids, dyeing vegetable fibers black. In this case it is preferable to employ metadinitrobenzene, which by reduction with sulfuret of sodium yields metaphenylenediamin. For example, I heat in a closed iron vessel at a temperature of from 240° to 260° centigrade for eight hours twenty-two kilograms of metaphenylenediamin and 6.40 kilograms of sulfur.

Fourth. *Sulfureted derivatives.* — Sulphaminol (metaoxythiodiphenylamin) reacts on sulfur in the presence of ammonia so as to yield a coloring-matter which is soluble in alkaline sulfids. Thioresorcin likewise yields in the presence of ammonia and of sulfur a coloring-matter which is soluble in alkaline sulfids.

Fifth. *Triamidated derivatives.* — Chrysoidin, resulting from the connection of diazobenzene with metaphenylenediamin, treated with sulfid of sodium, to which sulfur is subsequently added, yields likewise a direct coloring product for vegetable fibers. Bismarck brown likewise reacts under the same conditions. For example, I heat in a vessel provided with a mechanical stirring apparatus at a temperature of 240° twenty-five kilograms of chrysoidin or Bismarck brown and thirty kilograms of sulfid of sodium. After reduction I add 6.40 kilograms of sulfur. As soon as the product has formed a resistible mass which stops the agitation the reaction is terminated.

The products herein described of the action of sulfur (or sulfur and ammonia) upon the specified meta derivatives of benzene are different and readily distinguishable from the group of colors produced by the process described in United States Patent No. 532,484, dated January 15, 1895. The latter when dissolved in water or sodium sulfid color the solutions bottle-green and dye cotton green, turning to black on oxidation, whereas the former when dissolved in sodium sulfid give the solution a brownish tint (with more or less yellow or red) and dye unmordanted cotton a deep brown, approaching black. The isolated products of the patent referred to do not attract the moisture of the air, and when not mixed with sodium sulfid present themselves in the form of a brittle and hard blue-black mass. The products of the meta series, produced as herein described, strongly attract the moisture of the air, and under the conditions above stated are a deep brown or brownish black.

Having now particularly described and ascertained the nature of my said invention and in what manner the same is to be performed, I declare that what I claim is—

1. The process of producing coloring-matters by reacting with sulfur upon the specified meta derivatives of benzene (such as resorcin) the substances being heated together substantially as described.

2. The process of producing coloring-matters by reacting with sulfur upon the specified meta derivatives of benzene (such as resorcin) the substances being heated together in presence of an alkaline sulfid, substantially as described.

3. The specified coloring-matters derived from meta derivatives of benzene, by the action of sulfur, said coloring-matters being capable of directly dyeing cotton fibers a black or brown-black, being soluble in sodium sulfid appearing brown, being of a deep-brown color when unmixed with sodium sulfid, the isolated products having the capacity of strongly attracting the moisture of the air, substantially as described.

In testimony whereof I have signed this specification in the presence of two subscribing witnesses.

HENRI RAYMOND VIDAL.

Witnesses:
   EDWARD P. MACLEAN,
   ANTOINÉ ROUSSANNES.